United States Patent Office 3,669,749
Patented June 13, 1972

3,669,749
METHOD OF OPERATING ELECTROCHEMICAL CELLS WITH INCREASED CURRENT DENSITY AND OXYGEN EFFICIENCY
Robert J. Allen, Saugus, and Henry G. Petrow, Cambridge, Mass., assignors to Prototech Company, Cambridge, Mass.
No Drawing. Filed Mar. 20, 1968, Ser. No. 719,292
Int. Cl. H01m 27/00
U.S. Cl. 136—86 R    4 Claims

ABSTRACT OF THE DISCLOSURE

This disclosure is primarily concerned with the discovery of the improvement in the current density and oxygen efficiency of alkali media fuel cells and the like effected by the introduction into the cathode region thereof of a source of oxidizable boron.

---

The present invention relates to a method increasing the current density and oxygen efficiency of electro-chemical cells and, more particularly, though not exclusively, to such improved operation in fuel cells and the like employing high temperature, molten electrolytic media in which continuous peroxide and superoxide formation is attained. In co-pending application of David Moulton, Robert Novack and Walter Juda, U.S. Ser. No. 376,916, filed June 22, 1964, for Fuel Cell Apparatus and Method, now Pat. No. 3,471,335, a preferred cell of the above-described character is disclosed comprising a palladium-containing anode that is only permeable to hydrogen (pure, impure, or reformed) and carbon-containing fuels, as described in U.S. Pat. No. 3,206,333, an alkali-metal-hydroxide molten, substantially anhydrous electrolytic medium maintained at a temperature of about 350° C. to 600° C., and a nickel cathode which may, indeed, at least in part, comprise the container for the electrolytic medium. The electrolytic medium is maintained in contact with an oxygen-containing atmosphere in an amount sufficient to provide at least one of alkali-metal peroxide and superoxide within the electrolytic medium to serve as the sole oxidant for the fuel cell operation, this oxidant being utilized electrochemically to provide substantially the entire current output of the fuel cell. Oxygen (or air) may be introduced into the medium to enhance the formation and utilization of the peroxide and superoxide.

In cells of this character and other cells, it has been found that the cathode has a limited capacity and cathodic current density presumably because of the kinetic limitation of superoxide and peroxide formation and/or electrochemical utilization. In addition, the power output of such cells, even when provided with additives such as, for example, the oxidizable cobalt salts described in co-pending application of Henry G. Petrow, Ser. No. 659,-297, filed Aug. 9, 1967, for Method of and Apparatus for Catalytic Improvement in the Operation of Electrochemical Cells and the Like, now Pat. No. 3,471,331, varies substantially linearly inversely with oxygen partial pressure, limiting the available oxygen efficiency and the air recycling capabilities of the system.

It is to the obviating or relaxing of these above-recited limitations of operation that the present invention is primarily directed, it having been discovered that, in summary, boron-containing compounds capable of sufficiently stable oxidation and electrochemical action within the cell electrolytic medium surprisingly accomplish both the function of increasing operating current density and markedly increasing oxygen efficiency.

It is, accordingly, an object of the invention to provide a new and improved method of electrochemical cell operation that embodies this discovery and the improvements flowing therefrom.

Other and further objects will be explained hereinafter and are more particularly delineated in the appended claims.

Returning to the type of cells described in the co-pending applications and summarized above as illustrative, but not restricted to the application of the present invention, it has been found that while high peroxide and superoxide concentration in the electrolytic medium improves cathode performance, it also tends to decrease anode performance with regard to fuel efficiency (i.e., ratio of cell output current to the coulomb-equivalence of hydrogen fuel fed to the anode per second).

As described in said Petrow co-pending application, oxidizable cobalt and similar additives have been found to produce cathodic improvement. In connection with the boron compounds of the present invention, on the other hand, the rather surprising further property has been discovered that, unlike the cobalt, iron, manganese, or other additives mentioned in the co-pending Petrow application, the boron additives of the present invention not only provide for a substantial increase in current density of operation of cells of this character, but do not follow the limiting linear law of variation of power output of the cell with the inverse of oxygen partial pressure. To the contrary, it has been discovered that boron oxidizable compounds when added to the electrolytic media of the above-described cells cause the power output of the cell to vary substantially as the square root of the inverse of the partial pressure of oxygen.

Thus, in accordance with the present invention, the equivalent power output can be obtained from a cell with lower concentration of oxygen than the prior cells above discussed. From this fortuitous result flows the further advantage that much of the air introduced into the cell for the generation of the oxidant may be recycled, substantially increasing the oxygen efficiency and relaxing the air-treating apparatus requirements in cells of this character.

As a specific example, in a fuel cell of the above-described character embodying a molten substantially anhydrous electrolytic medium comprising 90 percent KOH and 10 percent NaOH and operated at a temperature of 500° C. with a palladium hydrogen anode of about 56 cm.$^2$ in area and a nickel cathode having approximately 4 to 5 times that area, and with air bubbled into the electrolytic medium in the vicinity of the cathode, normal current densities in the absence of additives have been produced of the order of 12.5 amperes at 0.6 volt. Under conditions of such operation, the oxygen efficiency has been of the order of 16 percent.

When, however, 1 percent by weight of, for example, $K_2B_4O_7$ is added to the electrolytic medium, particularly in the region of the cathode, the current density is markedly increased to about 20 amperes at the same 0.6 volt and the oxygen efficiency is almost doubled to a value of 25 to 30 percent.

It has been found that successful operation can thus be attained with boron-containing compounds capable of forming stable borates and perborates under these circumstances added in rather critical amounts of substantially 0.2 percent to substantially 10 percent by weight to the electrolytic medium; further amounts having been found not only to be unnecessary to attain the marked degree of improvement of the invention, but introducing deleterious corrosive and related effects.

Other suitable boron compounds include boric acid and sodium borate, it being understood that all boron-containing compounds similarly capable of forming substantially stable peroxy compounds which are electrochemically active and are formed at a fast enough rate to form high cathode densities, may be used in the latter connection. The remarkable and surprising operation of boron compounds is pointed up by the fact that other similar elements that have been known to form peroxy compounds such as molybdates, vanadates and chromates, when employed in the above cells did not produce the results of the above invention.

Further modifications will occur to those skilled in this art and all such are considered to fall within the spirit and scope of the invention as defined in the appended claims.

What is claimed is:

1. A method of operating a fuel cell containing an alkali-metal hydroxide electrolytic medium and of increasing the current density and oxygen efficiency, that comprises maintaining the medium at a temperature in excess of about 350 degrees C. and sufficient to render the medium molten and substantially anhydrous and in contact with an oxygen-containing atmosphere in an amount sufficient to provide in the medium at least one of alkali-metal peroxide and superoxide, said peroxide and superoxide functioning as substantially the sole fuel cell electrochemical oxidant, applying hydrogen-containing fuel to the fuel cell, introducing into the medium a source of oxidizable boron-containing compounds capable of forming stable electrochemically active peroxy compounds and increased cathode densities, and drawing current from said fuel cell while holding the said medium at such temperature and while utilizing said oxidant electrochemically to provide substantially the entire current output of the fuel cell.

2. A method as claimed in claim 1 and in which the percentage of the boron source in said medium is maintained at of the order of 0.2 to 10 percent by weight.

3. A method as claimed in claim 1 and in which the oxidizable boron source comprises one of $K_2B_4O_7$, sodium borate, and boric acid.

4. A method as claimed in claim 1 in which the said oxidizable boron source is introduced in said region.

References Cited

UNITED STATES PATENTS

| | | | |
|---|---|---|---|
| 1,675,828 | 7/1928 | Siegmund | 136—154 |
| 3,252,837 | 5/1966 | Satterfield | 136—86 |
| 3,360,401 | 12/1967 | Grasselli et al. | 136—86 |
| 3,345,214 | 10/1967 | Zauner et al. | 136—137 |
| 3,368,922 | 2/1968 | Salyer | 136—86 |

WINSTON A. DOUGLAS, Primary Examiner

H. A. FEELEY, Assistant Examiner

U.S. Cl. X.R.

136—154